(12) United States Patent
Hsu et al.

(10) Patent No.: US 10,678,123 B2
(45) Date of Patent: Jun. 9, 2020

(54) SYSTEM FOR CAPTURING PANORAMIC IMAGE OF SHOE SOLE

(71) Applicant: POU CHEN CORPORATION, Chang Hwa Hsien (TW)

(72) Inventors: Chien-Yu Hsu, Chang Hwa Hsien (TW); Ying-Chih Chen, Taichung (TW); Ting-Hsueh Chuang, Taichung (TW)

(73) Assignee: Pou Chen Corporation, Chang Hwa Hsien (TW)

( * ) Notice: Subject to any disclaimer, the term of this patent is extended or adjusted under 35 U.S.C. 154(b) by 73 days.

(21) Appl. No.: 16/103,656

(22) Filed: Aug. 14, 2018

(65) Prior Publication Data
US 2019/0163045 A1    May 30, 2019

(30) Foreign Application Priority Data
Nov. 28, 2017   (TW) .............................. 106141299 A (51) Int. Cl.
*G03B 37/00* (2006.01)
*H04N 5/232* (2006.01)
(Continued)

(52) U.S. Cl.
CPC ....... *G03B 37/005* (2013.01); *G01F 23/2927* (2013.01); *G02B 13/06* (2013.01);
(Continued)

(58) Field of Classification Search
CPC .. H04N 5/23238; G03B 37/005; G03B 37/04; G06T 3/4038; G06T 3/4053;
(Continued)

(56) References Cited

U.S. PATENT DOCUMENTS

2005/0151852 A1* 7/2005 Jomppanen .......... H04N 5/0733
                                                348/218.1
2012/0274739 A1* 11/2012 Li ........................ H04N 5/2624
                                                348/36
(Continued)

FOREIGN PATENT DOCUMENTS

CN       206671217 U     11/2017
JP       2001-153625 A    6/2001
(Continued)

OTHER PUBLICATIONS

Search Report appended to an Office Action, which was issued to Taiwanese counterpart application No. 106141299 by the TIPO dated Jun. 1, 2018, with an English translation thereof (2 pages).
(Continued)

*Primary Examiner* — Lin Ye
*Assistant Examiner* — John H Morehead, III
(74) *Attorney, Agent, or Firm* — Michael Best & Friedrich LLP (57) ABSTRACT

A system for capturing a panoramic image of a shoe sole includes a processor and a panoramic image capturing device that is disposed apart from an attachment surface of the shoe sole. The panoramic image capturing device captures a panoramic image of the attachment surface and an inner surface of a sidewall of the shoe sole. The panoramic image capturing device outputs the panoramic image. The processor obtains the panoramic image outputted by the panoramic image capturing device.

11 Claims, 13 Drawing Sheets

(51) Int. Cl.
  *G03B 37/04* (2006.01)
  *G02B 13/06* (2006.01)
  *G01F 23/292* (2006.01)
  *G06T 7/00* (2017.01)
  *G06T 3/40* (2006.01)

(52) U.S. Cl.
  CPC ............ *G03B 37/04* (2013.01); *G06T 3/4038* (2013.01); *G06T 3/4053* (2013.01); *G06T 7/0004* (2013.01); *H04N 5/23238* (2013.01); *G06T 2207/20221* (2013.01); *G06T 2207/30124* (2013.01)

(58) Field of Classification Search
  CPC ......... G06T 7/0004; G06T 2207/20221; G06T 2207/30124; G06T 7/001; G06T 2207/10024; G01F 23/2927; G02B 13/06; A43D 25/00
  See application file for complete search history.

(56) References Cited

U.S. PATENT DOCUMENTS

| | | | | |
|---|---|---|---|---|
| 2012/0307968 A1* | 12/2012 | Smith | .................. | G01V 5/0016 378/57 |
| 2015/0121632 A1* | 5/2015 | Kuo | .................... | A43D 119/00 12/18.1 |
| 2015/0121633 A1 | 5/2015 | Kuo | | |
| 2015/0135447 A1* | 5/2015 | Jurkovic | .................. | A43D 8/16 12/51 |
| 2015/0369756 A1* | 12/2015 | Rezgui | .................. | G01N 22/00 702/57 |
| 2016/0150156 A1* | 5/2016 | Okumura | ............. | H04N 5/2253 348/36 |
| 2017/0134713 A1* | 5/2017 | Lin | ...................... | H04N 13/106 |
| 2017/0345136 A1* | 11/2017 | Van der Auwera | ..... | G06T 5/006 |

FOREIGN PATENT DOCUMENTS

| | | |
|---|---|---|
| JP | 5620036 B1 | 9/2014 |
| KR | 10-20160124830 A | 10/2016 |
| TW | 201517831 A | 5/2015 |
| TW | M500479 U | 5/2015 |

OTHER PUBLICATIONS

The Office Action issued to Korean counterpart application No. 10-2018-0102898 by the KIPO dated Nov. 8, 2019.

* cited by examiner

FIG.13

SYSTEM FOR CAPTURING PANORAMIC IMAGE OF SHOE SOLE

CROSS-REFERENCE TO RELATED APPLICATION

This application claims priority of Taiwanese Invention Patent Application No.106141299, filed on Nov. 28, 2017.

FIELD

The disclosure relates to an image capturing system, and more particularly to a system for capturing a panoramic image of a shoe sole.

BACKGROUND

Figure 1:
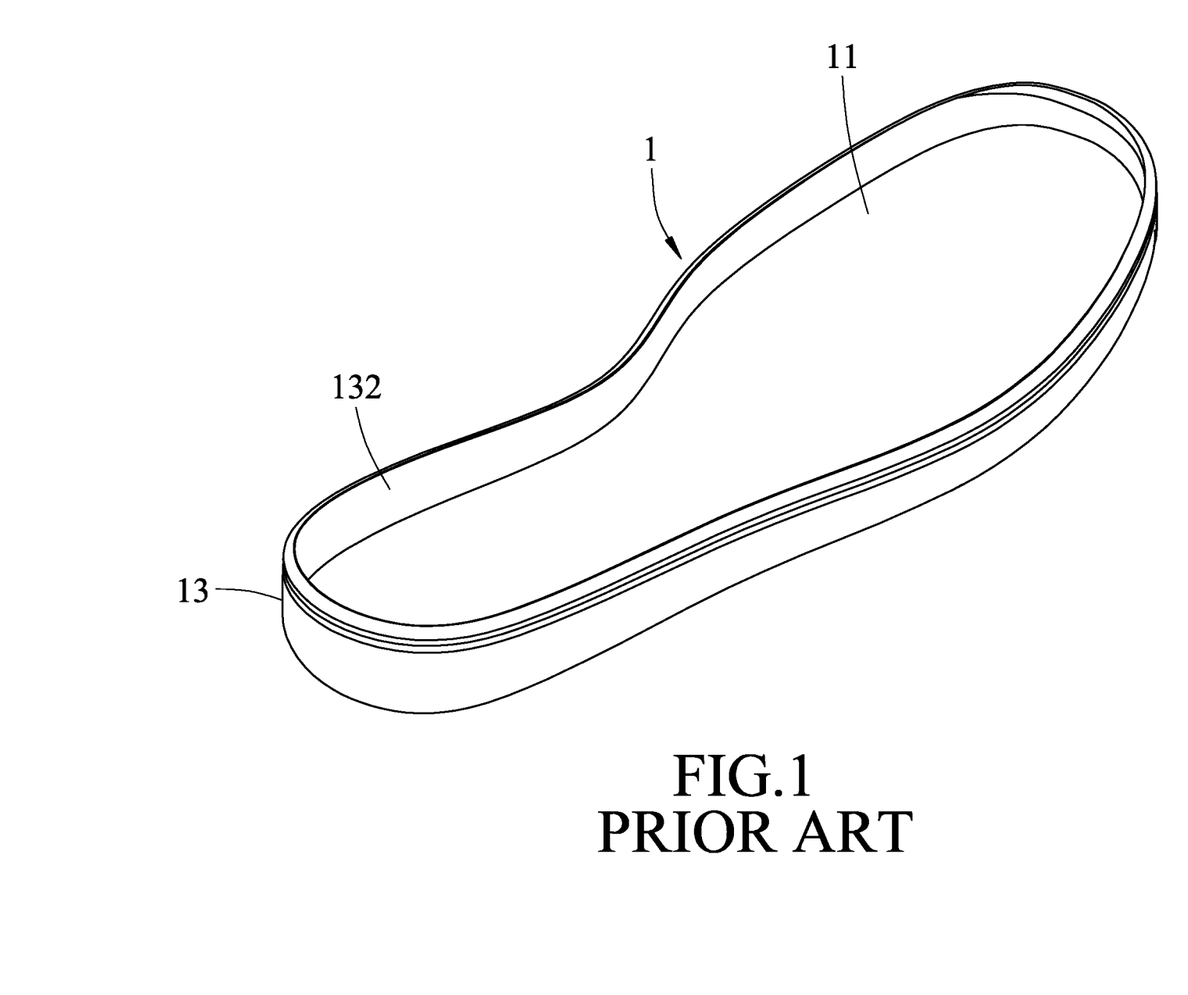
FIG. 1 is a perspective view exemplifying a shoe sole in general.

Referring to FIG. 1, a shoe sole 1 is illustrated. The shoe sole 1 has an attachment surface 11 that is to be attached to other part(s) of a shoe, and a sidewall 13 that surrounds a circumference of the attachment surface 11 and that has an inner surface 132 adjoining the attachment surface 11. In the manufacturing process of a shoe, the attachment surface 11 and the inner surface 132 are applied with a certain amount of glue, and a conventional approach of inspecting the certain amount of glue is by visual inspection. However, the conventional approach may be inefficient and error-prone.

SUMMARY

Therefore, an object of the disclosure is to provide a system for capturing a panoramic image of a shoe sole that can alleviate at least one of the drawbacks of the prior art.

According to the disclosure, the shoe sole has an attachment surface that is to be attached to other part(s) of a shoe, and a sidewall that surrounds a circumference of the attachment surface and that has an inner surface adjoining the attachment surface. The system includes a panoramic image capturing device and a processor. The panoramic image capturing device is disposed apart from the attachment surface of the shoe sole, and is configured to capture a panoramic image of the attachment surface and the inner surface of the sidewall, and to output the panoramic image. The processor is configured to obtain the panoramic image outputted by the panoramic image capturing device.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
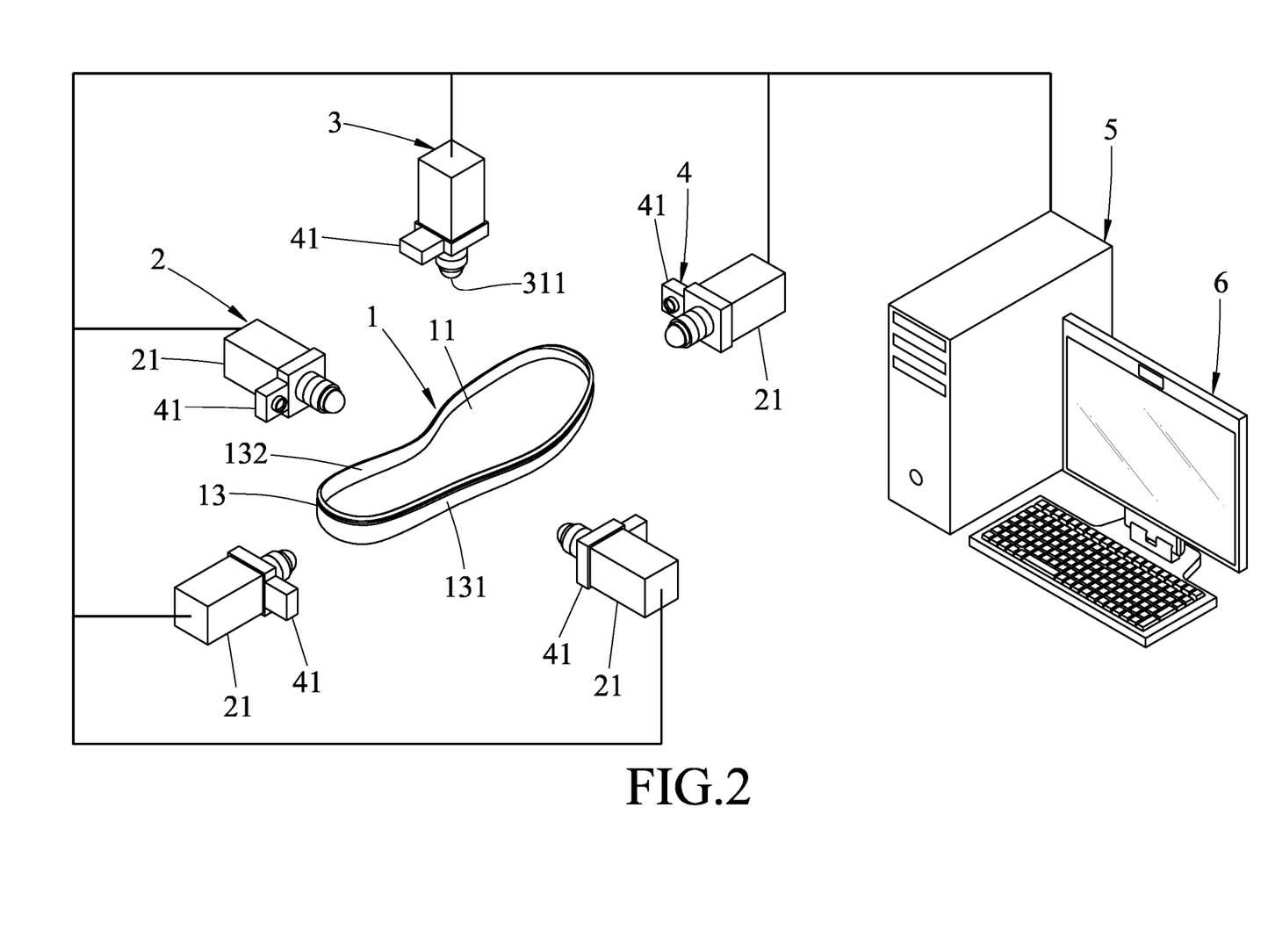
FIG. 2 is a schematic diagram illustrating an embodiment of a system for capturing a panoramic image of a shoe sole according to the disclosure.

Referring to FIG. 2, an embodiment of a system for capturing a panoramic image of a shoe sole 1 is illustrated.

The shoe sole 1 includes an attachment surface 11 and a sidewall 13. The attachment surface 11 is to be attached to other part(s) of a shoe (not shown). The sidewall 13 surrounds a circumference of the attachment surface 11. The sidewall 13 has an inner surface 132 adjoining the attachment surface 11, and an outer surface 131 opposite to the inner surface 132. The inner surface 132 of the sidewall 13 and the attachment surface 11 of the shoe sole 1 are to be applied with glue. In this embodiment, the glue is implemented to be colored glue, but implementation of the glue is not limited to the disclosure herein and may vary in other embodiments. The colored glue is used for the purpose of limiting the spectrum of light captured by the system.

The system includes a panoramic image capturing device 3, a lateral image capturing device set 2, a lighting device 4, a processor 5 and a display 6.

Figure 3:
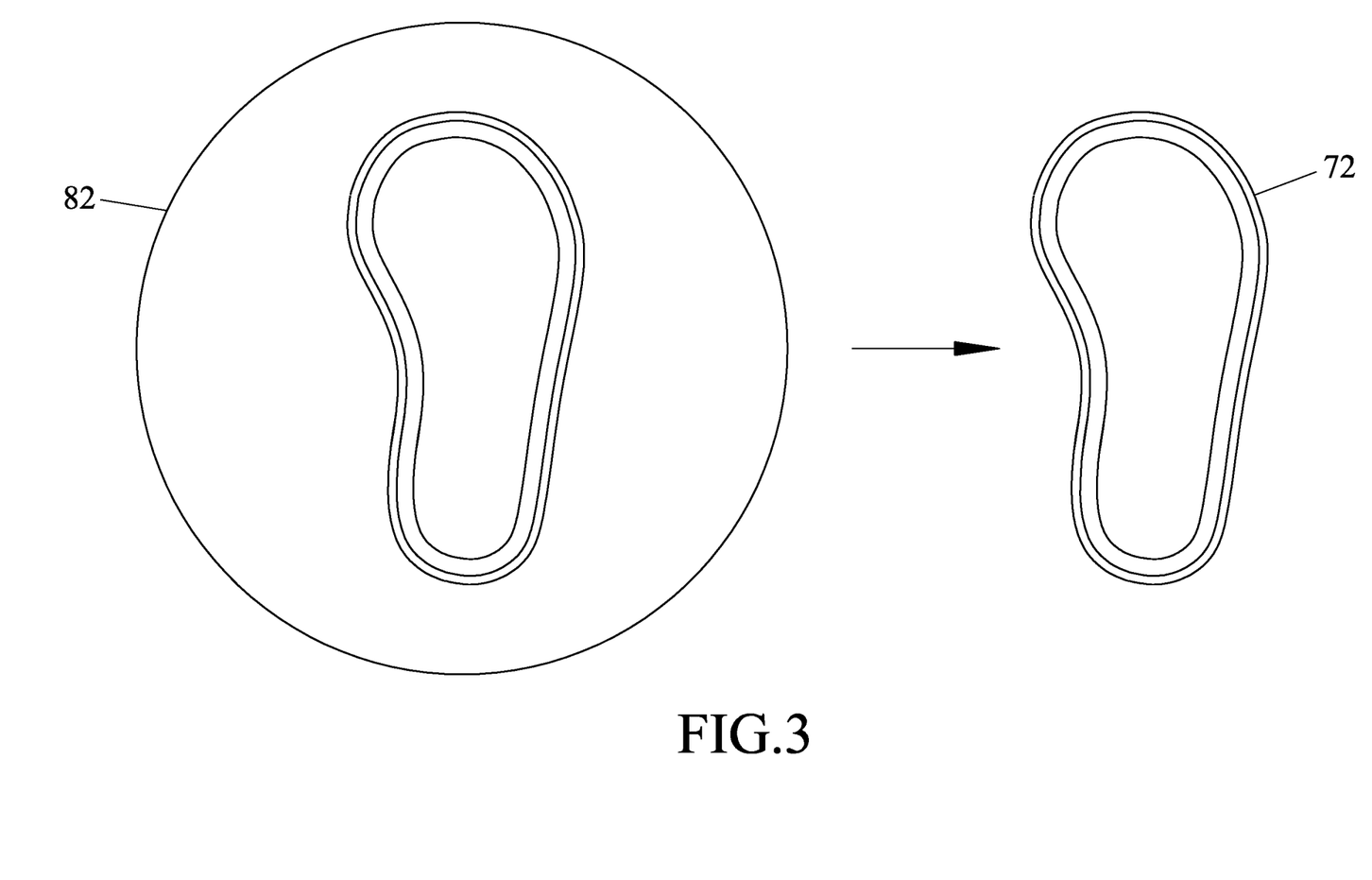
FIG. 3 is a schematic diagram illustrating an embodiment of extracting an image portion of the panoramic image that is associated with a top view of the shoe sole.
Figure 4:
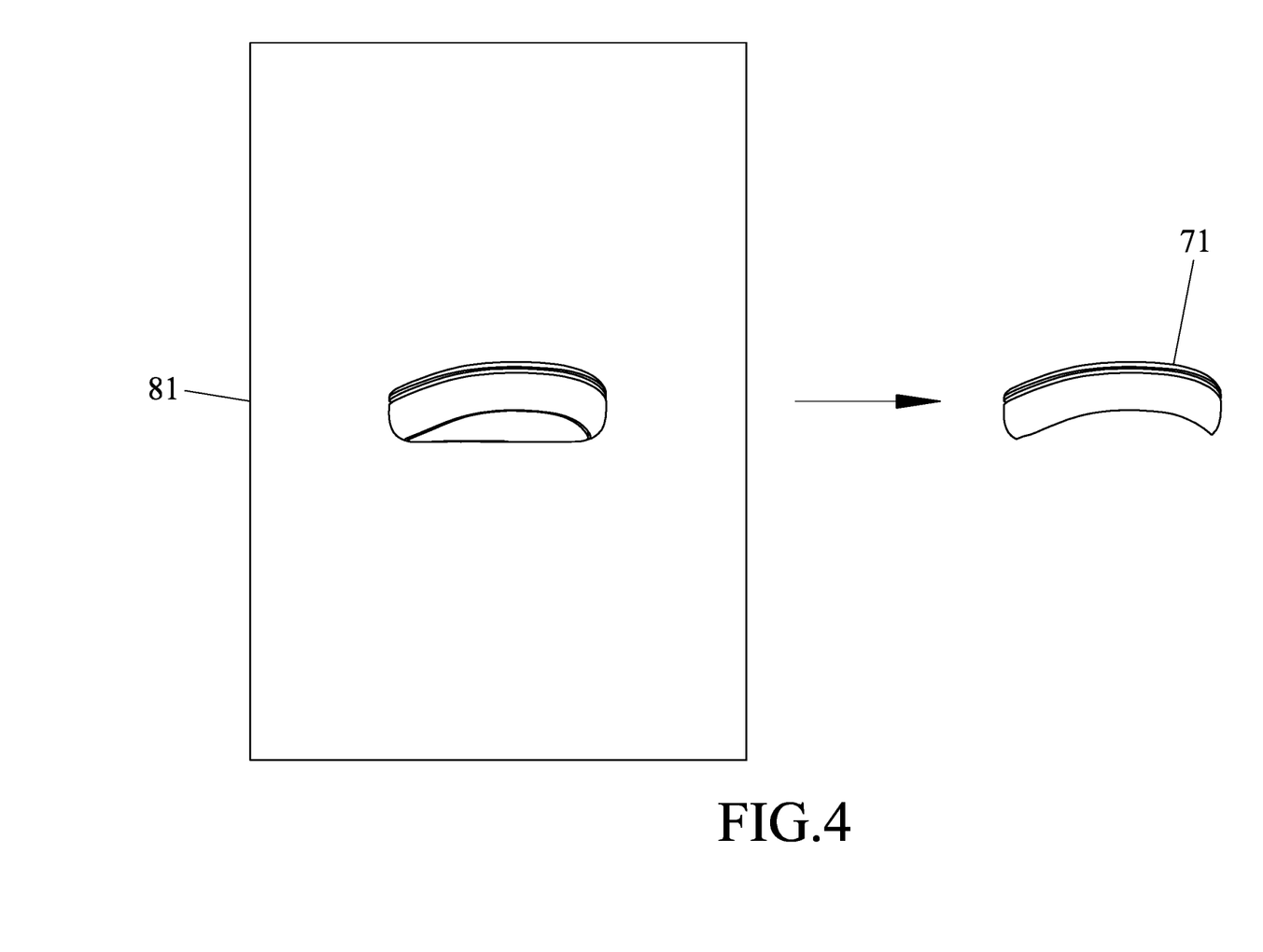
FIG. 4 is a schematic diagram illustrating an embodiment of extracting an image portion of a partial lateral image that is associated with a front side view of the shoe sole and that is captured by the system according to the disclosure.
Figure 5:
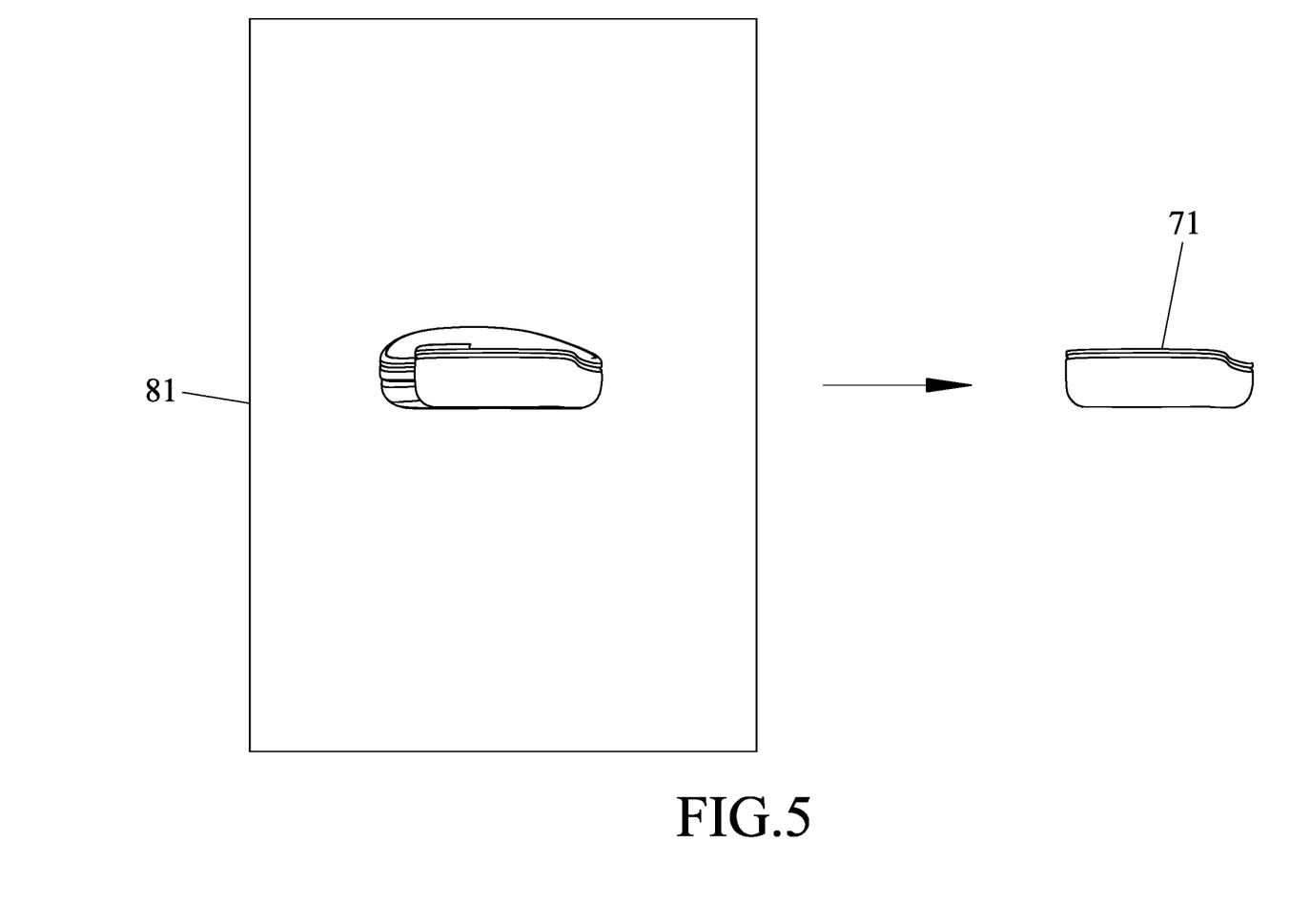
FIG. 5 is a schematic diagram illustrating an embodiment of extracting an image portion of a partial lateral image that is associated with a back side view of the shoe sole and that is captured by the system according to the disclosure.
Figure 6:
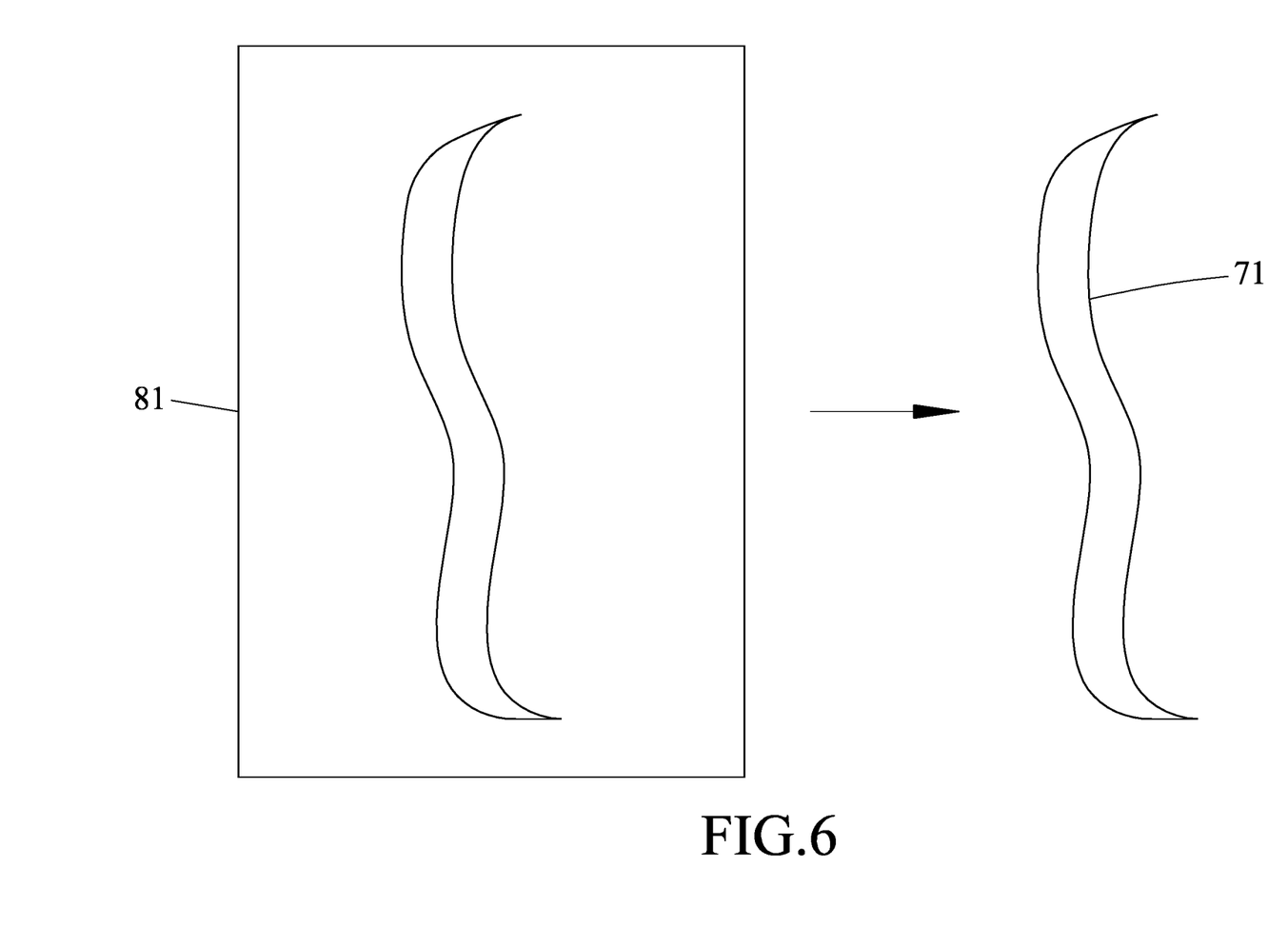
FIG. 6 is a schematic diagram illustrating an embodiment of extracting an image portion of a partial lateral image that is associated with a left side view of the shoe sole and that is captured by the system according to the disclosure.
Figure 7:
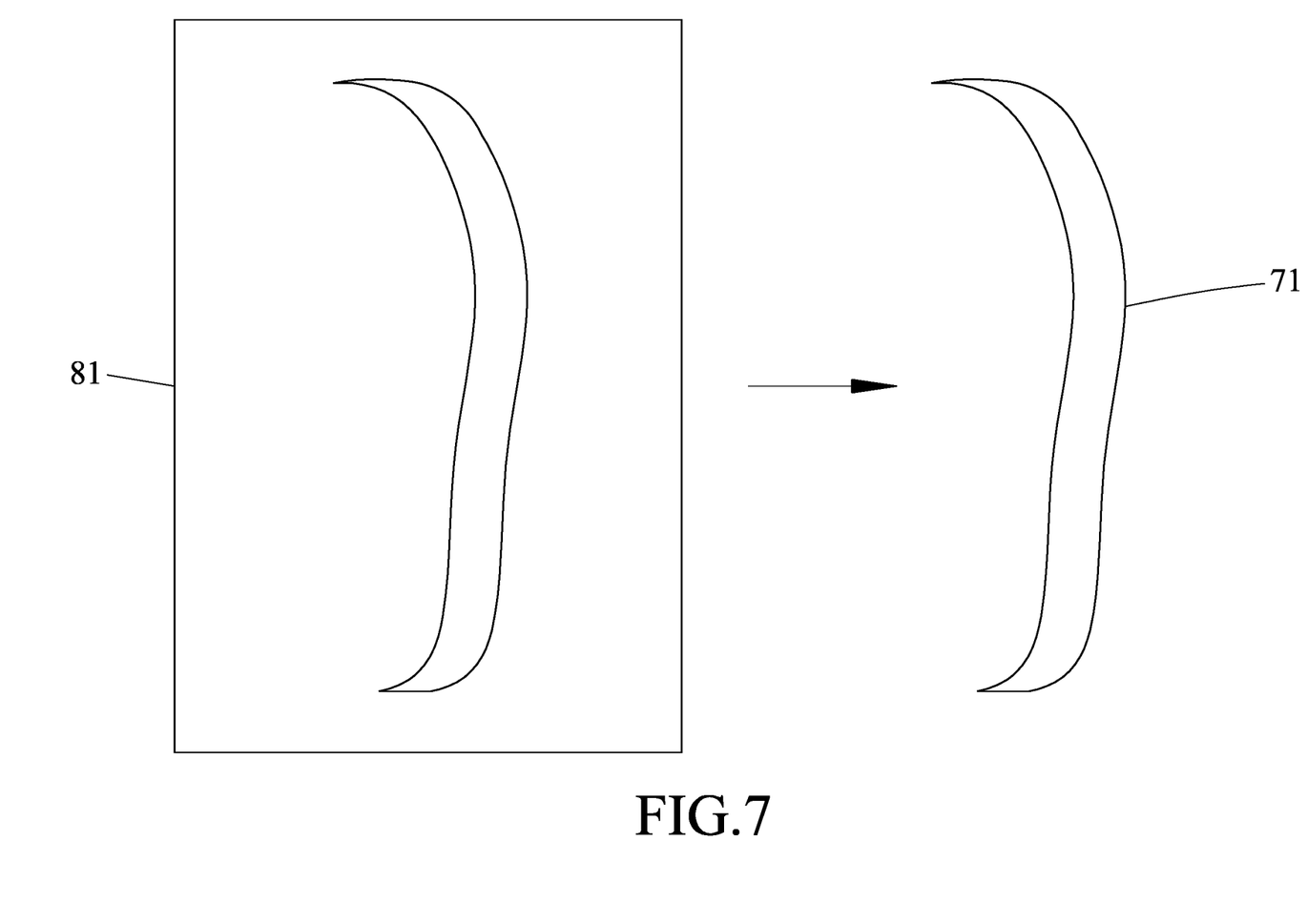
FIG. 7 is a schematic diagram illustrating an embodiment of extracting an image portion of a partial lateral image that is associated with a right side view of the shoe sole and that is captured by the system according to the disclosure.

Referring to FIGS. 2 to 7, the panoramic image capturing device 3 is disposed apart from the attachment surface 11 of the shoe sole 1. The panoramic image capturing device 3 has an angle of view that is defined as a diagonal angular extent of a given scene captured by the panoramic image capturing device 3 and that is greater than one hundred and eighty degrees. In this embodiment, the panoramic image capturing device 3 includes a fisheye lens 311 that has an angle of view that is greater than two hundred and twenty degrees, but implementation of the panoramic image capturing device 3 is not limited to what is disclosed herein and may vary in other embodiments. The panoramic image capturing device 3 is configured to capture a panoramic image 82 of the attachment surface 11 and the inner surface 132 of the sidewall 13 via the fisheye lens 311, and to output the panoramic image 82 as shown in FIG. 3.

The lateral image capturing device set 2 includes a plurality of lateral image capturing devices 21 which are disposed around the shoe sole 1. Each of the lateral image capturing devices 21 is configured to generate a partial lateral image 81 of the outer surface 131 of the sidewall 13 and to output the partial lateral image 81. In this embodiment, the lateral image capturing devices 21 are four in number, and are disposed respectively at the front side, the back side, the left side and the right side of the shoe sole 1 so as to generate four partial lateral images 81 that are associated respectively with a front side view, a back side view, a left side view, and a right side view of the shoe sole 1 as shown in FIGS. 4 to 7, respectively.

In this embodiment, the lighting device 4 is configured to illuminate the shoe sole 1 with light beams that have wavelengths ranging between 10 nanometers and 400 nanometers. That is to say, the light beams are implemented to be Ultraviolet light (UV light). The lighting device 4 is implemented to include five UV lamps 41 respectively disposed on the panoramic image capturing device 3 and the lateral image capturing devices 21. The colored glue contains a fluorescent substance which emits colored glow when exposed to the UV light so the glue can be observed with ease under illumination of the UV light. However, implementations of the light beams are not limited to the disclosure herein and may vary in other embodiments.

The processor 5 is electrically connected with the panoramic image capturing device 3 and the lateral image capturing devices 21. In this embodiment, the processor 5 may be implemented to be a microprocessor, a digital signal processor (DSP), an applicant-specific instruction set processor (ASIP), or a central processing unit (CPU) for a laptop computer, a notebook computer or a tablet computer, but implementation thereof is not limited to what are disclosed herein and may vary in other embodiments.

Figure 8:
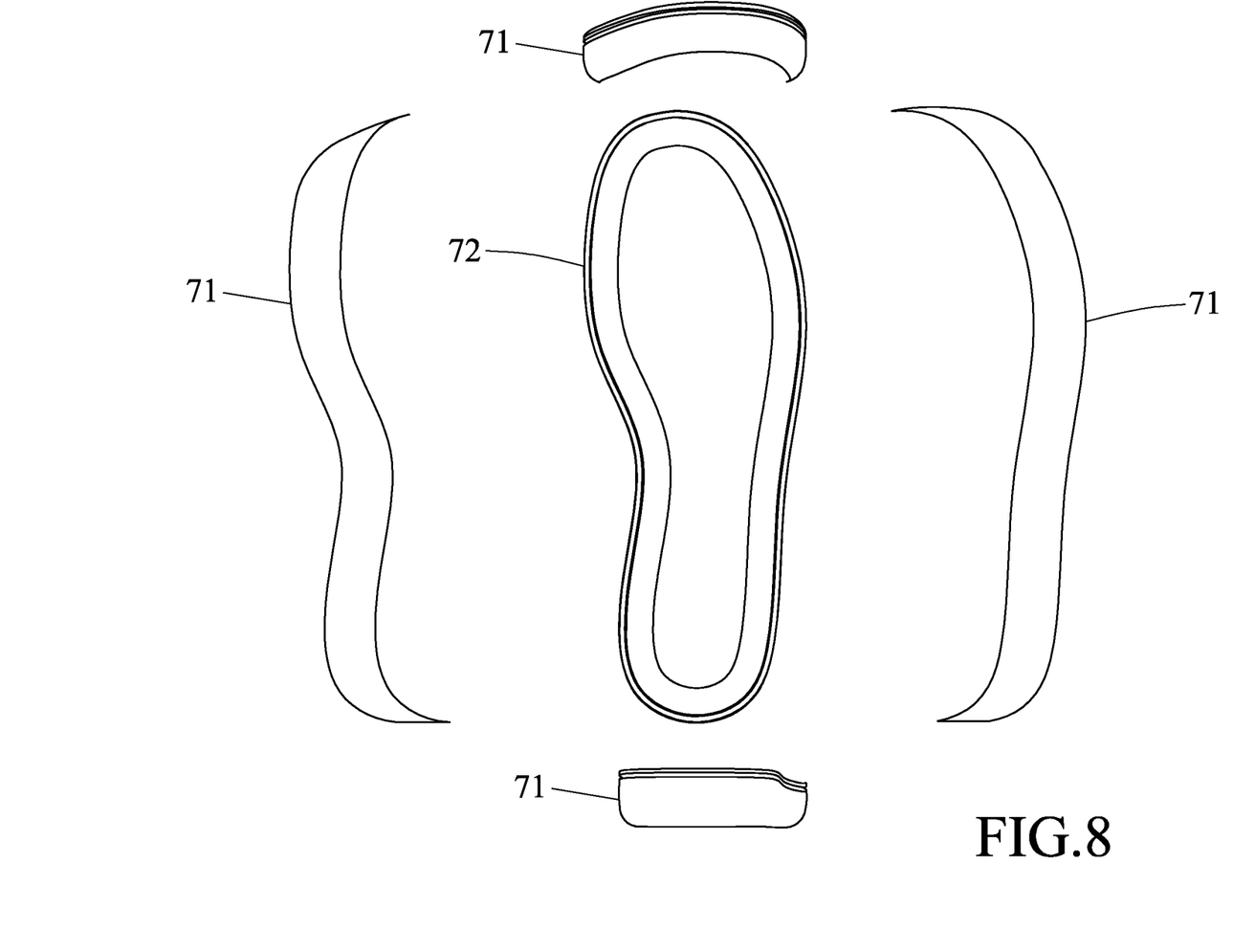
FIGS. 8 and 9 are schematic diagrams cooperatively illustrating an embodiment of splicing the image portions extracted in FIGS. 3 to 7 to result in a combinational image.
Figure 9:
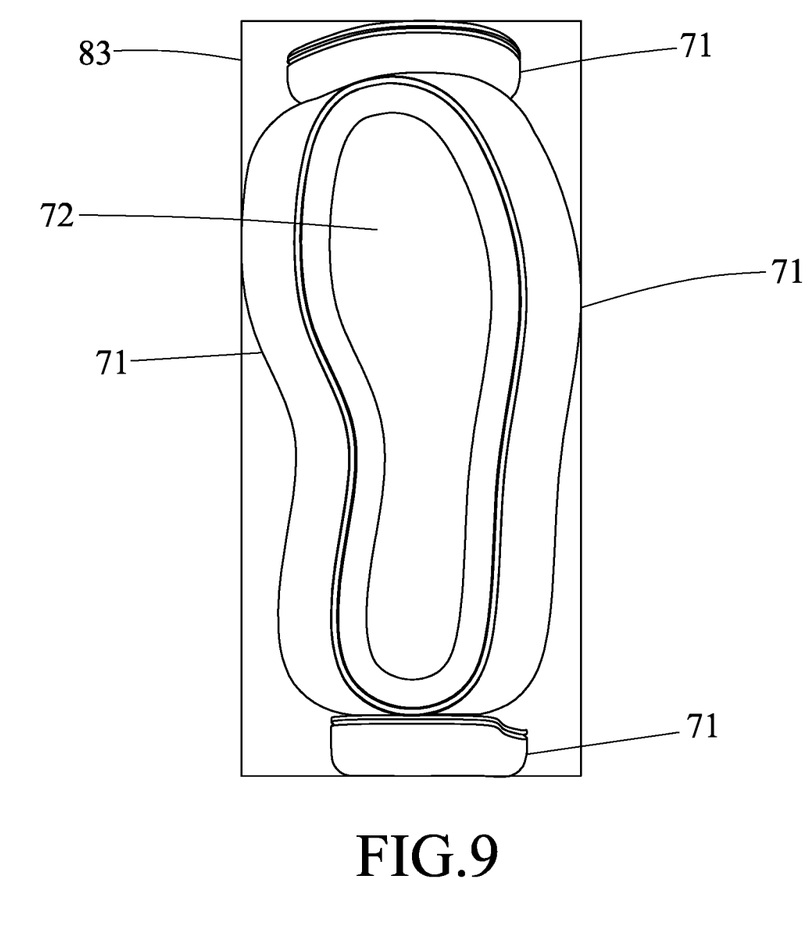

Referring to FIGS. 3 to 9, the processor 5 is configured to obtain the panoramic image 82 outputted by the panoramic image capturing device 3 and the partial lateral images 81 respectively outputted by the lateral image capturing devices 2, and to generate a combinational image 83 by splicing the panoramic image 82 and the partial lateral images 81. Specifically speaking, the processor 5 is configured to perform edge detection process, image recognition, and other image processing techniques on the panoramic image 82 and the partial lateral images 81, so as to remove unnecessary background portions of the panoramic image 82 and the partial lateral images 81, and to extract an image portion 72 of the panoramic image 82 that is associated with the attachment surface 11 and the inner surface 132 of the sidewall 13, and image portions 71 of the partial lateral images 81 that are associated with the outer surface 131 of the sidewall 13 from different viewpoints as shown in FIGS. 4 to 7. Thereafter, the processor 5 is configured to splice the image portion 72 of the panoramic image 82 and the image portions 71 of the partial lateral images 81 so as to generate the combinational image 83 as shown in FIGS. 8 and 9. The combinational image 83 may be utilized in the determination of the amount of the glue applied to the shoe sole 1.

It is worth to note that implementations of the edge detection process, image recognition, and other image processing techniques are well known to one skilled in the relevant art, so explanation of the same is omitted herein for the sake of brevity.

The display 6 is configured to display the combinational image 83. In this embodiment, the display 6 may be implemented to be a liquid-crystal display (LCD), a light-emitting diode (LED) display or a plasma display panel (PDP), but implementation thereof is not limited to what are disclosed herein and may vary in other embodiments.

In one embodiment, an inspector inspects the condition of application of the glue on the shoe sole 1 by performing visual inspection on the combinational image 83 via the display 6. Since the combinational image 83 contains images of the inner surface 132 of the sidewall 13, the attachment surface 11 of the shoe sole 1, and the outer surface 131 of the sidewall 13 from different viewpoints in a single image, the inspector is able to inspect the shoe sole 1 with one glance, without having to physically flip the shoe sole 1. Therefore, efficiency of inspection is improved. In other words, the inspector may be able to quickly estimate the amount of the glue applied to the inner surface 132 of the sidewall 13 and the attachment surface 11 of the shoe sole 1 (e.g., normal, excessive or deficient), to determine whether there is excessive glue flowing to the outer surface 131, and to take appropriately action so as to prevent the occurrence of defects in the manufacturing process of shoes.

In one embodiment, the inspection of the condition of application of the glue on the shoe sole 1 is implemented by means of automation, an example of which is disclosed as follows.

Figure 12:
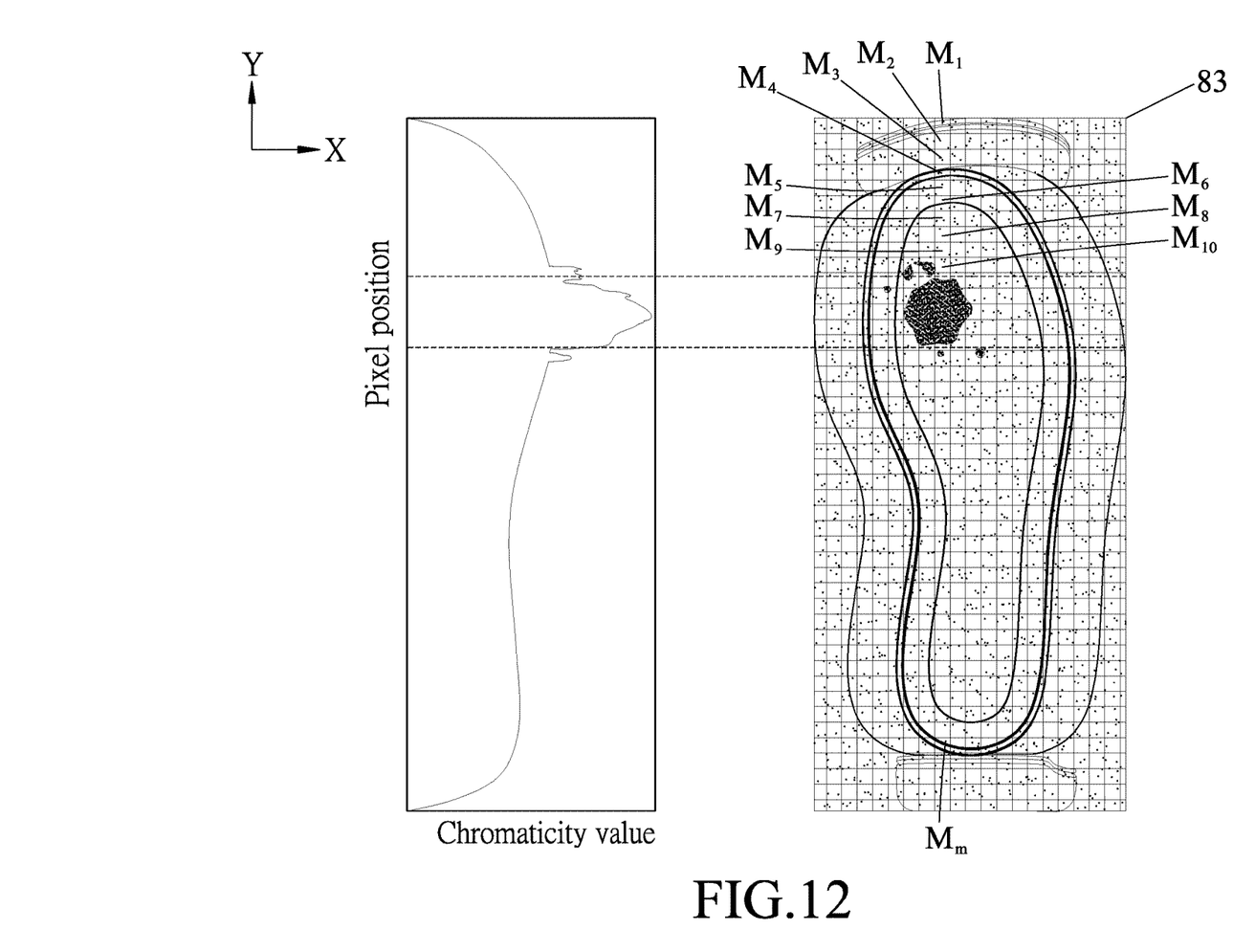
FIG. 12 is a schematic diagram illustrating an embodiment of chromaticity values of pixels selected from still another instance of the combinational image associated with the shoe sole that is applied with an excessive amount of the glue.
Figure 13:
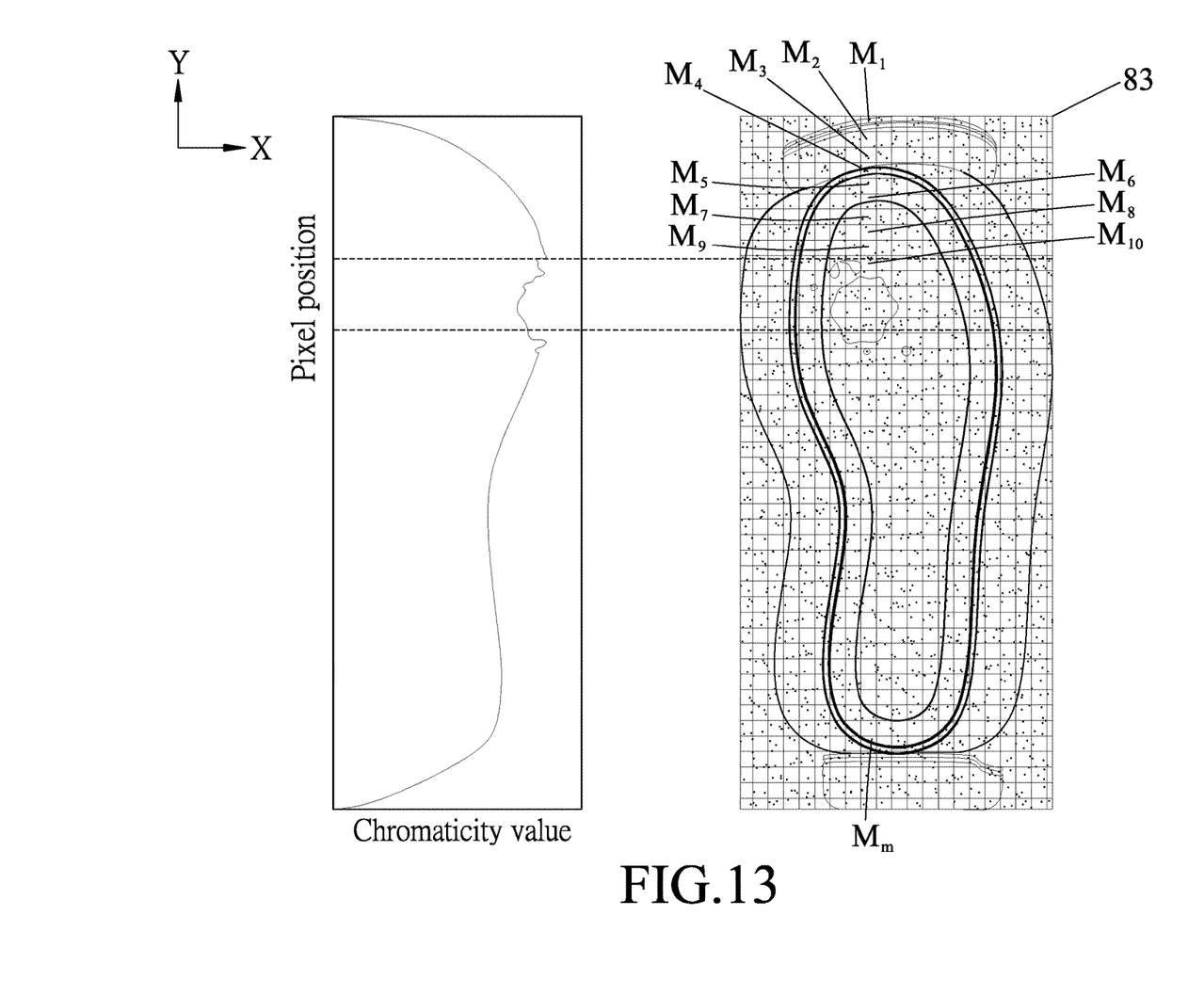
FIG. 13 is a schematic diagram illustrating an embodiment of chromaticity values of pixels selected from further another instance of the combinational image associated with the shoe sole that is applied with a deficient amount of the glue.

The processor 5 is further configured to obtain chromaticity values $M_1$ to $M_m$ of m number of pixels selected from an instance of the combinational image 83 associated with the shoe sole 1 that is applied with the glue as shown in one of FIGS. 12 and 13, and to generate a result of estimation regarding an amount of the glue applied to the shoe sole 1 based on the chromaticity values $M_1$ to $M_m$, where m is an integer not less than one. It is worth noting that in this embodiment, the chromaticity values $M_1$ to $M_m$ are values from a single channel of color (e.g., blue channel) of the pixels on the combinational image 83.

Figure 10:
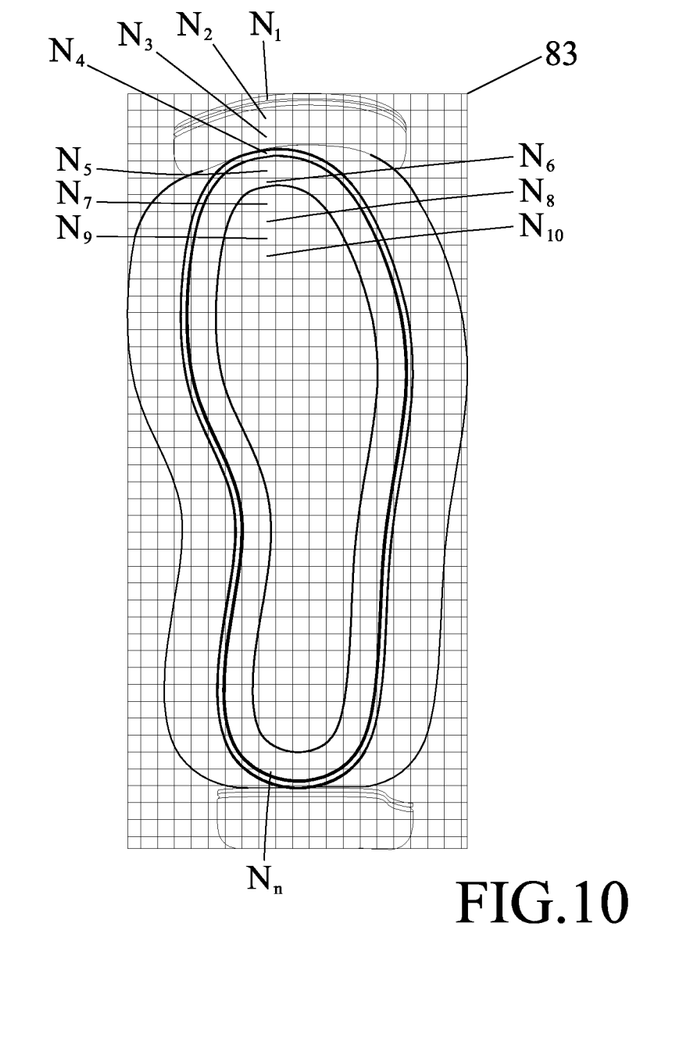
FIG. 10 is a schematic diagram illustrating an embodiment of a reference image which is an instance of the combinational image associated with the shoe sole that is not applied with the glue.

Furthermore, the processor 5 is configured to obtain chromaticity values $N_1$ to $N_m$ of m number of pixels selected from a reference image which is another instance of the combinational image 83 associated with the shoe sole 1 that is not applied with the glue as shown in FIG. 10. The m number of pixels which are selected from the reference image respectively correspond to the pixels which are selected from the instance of the combinational image 83 associated with the shoe sole 1 that is applied with the glue. The processor 5 is configured to calculate m number of deviation values $R_i = M_i - N_i$, where i is an integer ranging from 1 to m. In one embodiment, for one of the m number of deviation values $R_i$, the processor 5 is configured to generate the result of estimation which indicates that the amount of the glue is normal when it is determined by the processor 5 that a condition that the deviation value falls in a range from $V_0 - A$ to $V_0 + A$ is satisfied, and to generate the result of estimation which indicates that the amount of the glue is abnormal when it is determined by the processor 5 that the condition is not satisfied, where $V_0$ represents a predetermined base value, and A represents a predetermined tolerance value.

Figure 11:
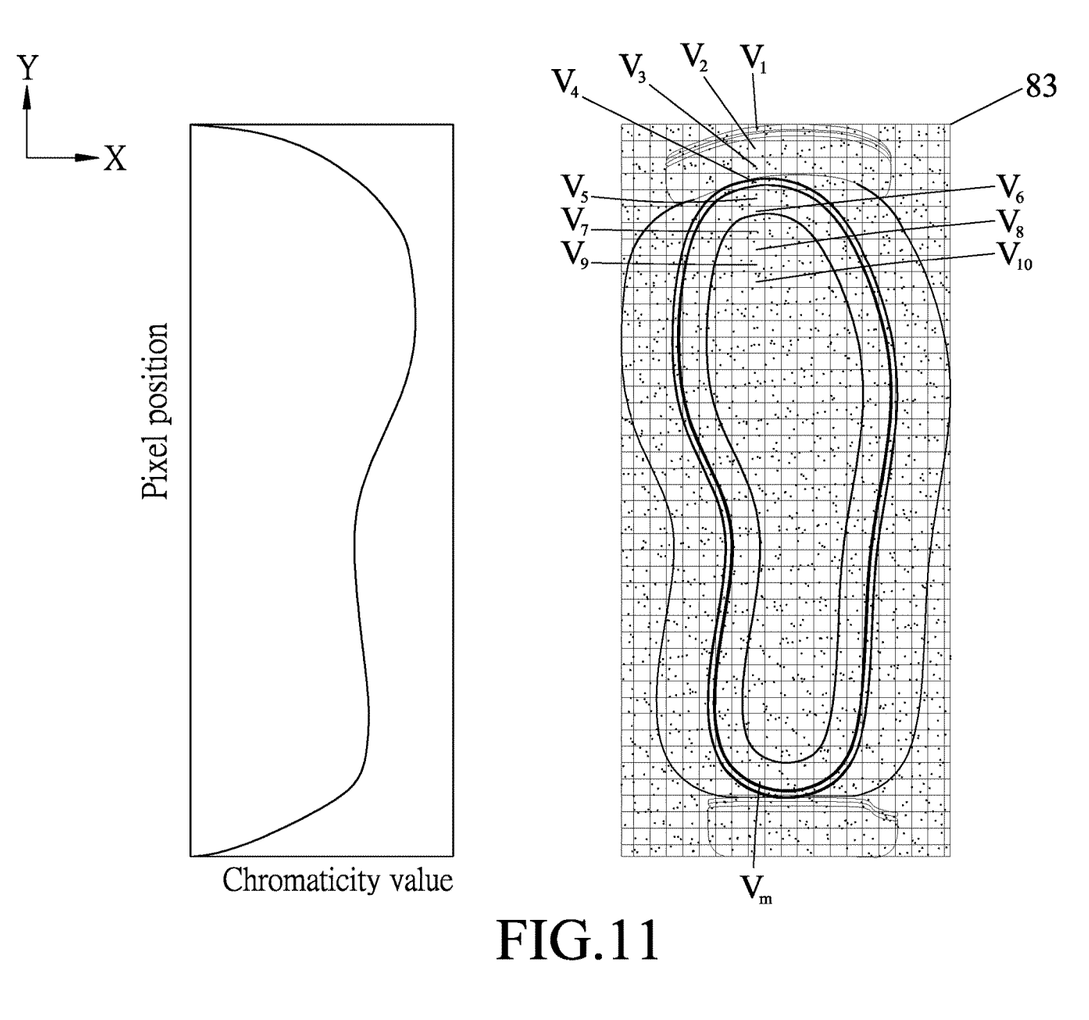
FIG. 11 is a schematic diagram illustrating an embodiment of chromaticity values of pixels selected from another instance of the combinational image associated with the shoe sole that is applied with a desired amount of the glue.

In one embodiment, the predetermined base value is $$V_0 = \sum_{i=1}^{m} \frac{V_i - N_i}{m},$$

where $V_1$ to $V_m$ each represent a respective one of m number of predetermined standard values which are chromaticity values of m number of pixels selected from a standard image which is further another instance of the combinational image 83 associated with the shoe sole 1 that is applied with a desired, standard amount of the glue as shown in FIG. 11.

In one embodiment, the processor 5 is configured to calculate m number of difference values $J_i = R_i - V_0$ where i is an integer ranging from 1 to m. For one of the m number of difference values $J_i$, the processor 5 is configured to generate the result of estimation which indicates that the amount of the glue is normal when it is determined by the processor 5 that the difference value falls in another range from $-A$ to $+A$, to generate the result of estimation which indicates that the amount of the glue is abnormal and deficient when it is determined by the processor 5 that the difference value $J_i$ is smaller than $-A$, and to generate the result of estimation which indicates that the amount of the glue is abnormal and excessive when it is determined by the processor 5 that the difference value is greater than $+A$.

Each of FIGS. 12 and 13 illustrates a profile of the chromaticity values of pixels selected along a Y direction in the combinational image 83 of the shoe sole 1. In FIG. 12, the chromaticity values of pixels between two dashed lines are substantially greater than those outside the two dashed lines, which means that the amount of the glue applied to the portions of the shoe sole 1 corresponding to the selected pixels between the two dashed lines is greater than other portions of the shoe sole 1 corresponding to the selected pixels outside the two dashed lines. On the other hand, in FIG. 13, the chromaticity values of pixels between the two dashed lines are generally smaller than those outside of and nearby the two dashed lines, which means that the amount of the glue applied to the portions of the shoe sole 1 corresponding to the selected pixels between the two dashed lines is smaller than other portions of the shoe sole 1 corresponding to the selected pixels outside of and nearby the two dashed lines.

Next, an example of estimating the amount of the glue applied to the shoe sole 1 will be provided. Referring to Table 1, seven pixels along the Y direction of the combinational image 83 (as shown in FIG. 12 or 13) associated with the shoe sole 1 that is applied with the glue are selected for inspection, i.e., m=7. The processor 5 performs operations described in the following based on information provided in Table 1 so as to determine the amount of glue applied to parts of the shoe sole 1 corresponding to the pixels which are selected from the combinational image 83 associated with the shoe sole 1 that is applied with the glue. It should be noted that there is no correspondence relationship from $M_1$ to $M_{10}$ shown in FIG. 12 or 13 and the example provided in Table 1. In this example, the chromaticity values of corresponding seven pixels selected from the reference image are all determined to be one hundred, i.e., $N_i = 100$ for i is an integer ranging from 1 to 7, and the predetermined tolerance value is assumed to be five, i.e., A=5.

TABLE 1

| m | $V_i$ | $V_i - N_i$ | Chromaticity values $M_i$ | Deviation value $R_i$ | Difference value $J_i$ | Range of tolerance +A~−A | Result of estimation |
|---|---|---|---|---|---|---|---|
| 1 | 111 | 11 | 121 | 21 | 7.857 | +5~−5 | Abnormal Excessive |
| 2 | 114 | 14 | 135 | 35 | 21.857 | +5~−5 | Abnormal Excessive |
| 3 | 112 | 12 | 119 | 19 | 5.857 | +5~−5 | Abnormal Excessive |
| 4 | 113 | 13 | 105 | 5 | −8.143 | +5~−5 | Abnormal Deficient |
| 5 | 114 | 14 | 100 | 0 | −13.143 | +5~−5 | Abnormal Deficient |
| 6 | 115 | 15 | 114 | 14 | 0.857 | +5~−5 | Normal |
| 7 | 113 | 13 | 113 | 13 | −0.143 | +5~−5 | Normal |
| | Base value | 13.143 | | | | | |

The processor 5 calculates the predetermined base value to be $$V_0 = \sum_{i=1}^{m} \frac{V_i - N_i}{m} = \frac{11 + 14 + 12 + 13 + 14 + 15 + 13}{7} = 13.143.$$

In one embodiment, the processor 5 calculates the deviation values $R_i = M_i - N_i$ for i ranging from 1 to 7 as follows:

$R_1 = M_1 - N_1 = 121 - 100 = 21;$ $R_2 = M_2 - N_2 = 135 - 100 = 35;$ $R_3 = M_3 - N_3 = 119 - 100 = 19;$ $R_4 = M_4 - N_4 = 105 - 100 = 5;$ $R_5 = M_5 - N_5 = 100 - 100 = 0;$ $R_6 = M_6 - N_6 = 114 - 100 = 14;$ $R_7 = M_7 - N_7 = 113 - 100 = 13.$

Based on the deviation values previously calculated, i.e., $R_i = M_i - N_i$ for i ranging from 1 to 7, the processor 5 generates the results of estimation each of which regards the amount of glue applied to a part of the shoe sole 1 corresponding to a respective one of the pixels selected from the combinational image 83.

The deviation value of the first one of the pixels selected from the combinational image 83 is calculated as $R_1 = 21$, which is greater than the upper bound of the range from 18.143 to 8.143 (the range from $V_0 + A$ to $V_0 - A$), i.e., greater than 18.143, so the processor 5 determines that the amount of glue applied to a part of the shoe sole 1 corresponding to the first one of the pixels selected from the combinational image 83 is abnormal and excessive.

The deviation value of the second one of the pixels selected from the combinational image 83 is calculated as $R_2 = 35$, which is greater than the upper bound of the range from 18.143 to 8.143, i.e., greater than 18.143, so the processor 5 determines that the amount of glue applied to a part of the shoe sole 1 corresponding to the second one of the pixels selected from the combinational image 83 is abnormal and excessive.

The deviation value of the third one of the pixels selected from the combinational image 83 is calculated as $R_3 = 19$, which is greater than the upper bound of the range from 18.143 to 8.143, i.e., greater than 18.143, so the processor 5 determines that the amount of glue applied to a part of the shoe sole 1 corresponding to the third one of the pixels selected from the combinational image 83 is abnormal and excessive.

The deviation value of the forth one of the pixels selected from the combinational image 83 is calculated as $R_4=5$, which is smaller than the lower bound of the range from 18.143 to 8.143, i.e., smaller than 8.143, so the processor 5 determines that the amount of glue applied to a part of the shoe sole 1 corresponding to the fourth one of the pixels selected from the combinational image 83 is abnormal and deficient.

The deviation value of the fifth one of the pixels selected from the combinational image 83 is calculated as $R_5=0$, which is smaller than the lower bound of the range from 18.143 to 8.143, i.e., smaller than 8.143, so the processor 5 determines that the amount of glue applied to a part of the shoe sole 1 corresponding to the fifth one of the pixels selected from the combinational image 83 is abnormal and deficient.

The deviation value of the sixth one of the pixels selected from the combinational image 83 is calculated as $R_6=14$, which falls in the range from 18.143 to 8.143, so the processor 5 determines that the amount of glue applied to a part of the shoe sole 1 corresponding to the sixth one of the pixels selected from the combinational image 83 is normal.

The deviation value of the seventh one of the pixels selected from the combinational image 83 is calculated as $R_7=13$, which falls in the range from 18.143 to 8.143, so the processor 5 determines that the amount of glue applied to a part of the shoe sole 1 corresponding to the seventh one of the pixels selected from the combinational image 83 is normal.

In one embodiment, the processor 5 calculates the difference values $J_i=R_i-V_O$ for i ranging from 1 to 7 as follows:

$$J_1=R_1-V_0=21-13.143=7.857;$$

$$J_2=R_2-V_0=35-13.143=21.857;$$

$$J_3=R_3-V_0=19-13.143=5.857;$$

$$J_4=R_4-V_0=5-13.143=-8.143;$$

$$J_5=R_5-V_0=0-13.143=-13.143;$$

$$J_6=R_6-V_0=14-13.143=0.857;$$

$$J_7=R_7-V_0=13-13.143=-0.143.$$

Based on the difference values previously calculated, i.e., $J_i=R_i-V_O$ for i ranging from 1 to 7, the processor 5 generates the results of estimation each of which regards the amount of glue applied to a part of the shoe sole 1 corresponding to a respective one of the pixels selected from the combinational image 83.

The difference value of the first one of the pixels selected from the combinational image 83 is calculated as $J_1=7.857$, which is greater than the upper bound of said another range from −5 to +5 (said another range from −A to +A), i.e., greater than +5, so the processor 5 determines that the amount of glue applied to a part of the shoe sole 1 corresponding to the first one of the pixels selected from the combinational image 83 is abnormal and excessive.

The difference value of the second one of the pixels selected from the combinational image 83 is calculated as $J_2=21.857$, which is greater than the upper bound of said another range from −5 to +5, i.e., greater than +5, so the processor 5 determines that the amount of glue applied to a part of the shoe sole 1 corresponding to the second one of the pixels selected from the combinational image 83 is abnormal and excessive.

The difference value of the third one of the pixels selected from the combinational image 83 is calculated as $J_3=5.857$, which is greater than the upper bound of said another range from −5 to +5, i.e., greater than +5, so the processor 5 determines that the amount of glue applied to a part of the shoe sole 1 corresponding to the third one of the pixels selected from the combinational image 83 is abnormal and excessive.

The difference value of the forth one of the pixels selected from the combinational image 83 is calculated as $J_4=-8.143$, which is smaller than the lower bound of said another range from −5 to +5, i.e., smaller than −5, so the processor 5 determines that the amount of glue applied to a part of the shoe sole 1 corresponding to the fourth one of the pixels selected from the combinational image 83 is abnormal and deficient.

The difference value of the fifth one of the pixels selected from the combinational image 83 is calculated as $J_5=-13.143$, which is smaller than the lower bound of said another range from −5 to +5, i.e., smaller than −5, so the processor 5 determines that the amount of glue applied to a part of the shoe sole 1 corresponding to the fifth one of the pixels selected from the combinational image 83 is abnormal and deficient.

The difference value of the sixth one of the pixels selected from the combinational image 83 is calculated as $J_6=0.857$, which falls in said another range from −5 to +5, so the processor 5 determines that the amount of glue applied to a part of the shoe sole 1 corresponding to the sixth one of the pixels selected from the combinational image 83 is normal.

The difference value of the seventh one of the pixels selected from the combinational image 83 is calculated as $J_7=-0.143$, which falls in said another range from −5 to +5, so the processor 5 determines that the amount of glue applied to a part of the shoe sole 1 corresponding to the seventh one of the pixels selected from the combinational image 83 is normal.

In summary, the system for capturing a panoramic image of a shoe sole according to the disclosure utilizes the panoramic image capturing device to capture and output the panoramic image of the shoe sole. A larger angle of view of the panoramic image capturing device ensures wider field of view of a single image captured by the system, and enables the system to efficiently capture images of the shoe sole which contains the attachment surface 11 and the inner surface 132 so as to generate the panoramic image that thoroughly presents the details of the shoe sole. Moreover, the system according to the disclosure realizes automatic determination of the amount of glue applied to the shoe sole based on the chromaticity values of selected pixels of the panoramic image. Consequently, efficiency of inspection in the manufacturing process of the shoe may be enhanced, and cost of production of shoes may be reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for capturing a panoramic image of a shoe sole, the shoe sole having an attachment surface that is to be attached to other part(s) of a shoe, and a sidewall that surrounds a circumference of the attachment surface and that has an inner surface adjoining the attachment surface, the shoe sole being applied with glue, said system comprising:
   a lighting device configured to illuminate the shoe sole with light beams that have wavelengths ranging between 10 nanometers and 400 nanometers;
   a panoramic image capturing device disposed apart from the attachment surface of the shoe sole, and configured to capture a panoramic image of the attachment surface and the inner surface of the sidewall, and to output the panoramic image; and
   a processor configured to
      obtain the panoramic image outputted by the panoramic image capturing device,
      obtain chromaticity values $M_1$ to $M_m$ of m number of pixels selected from an instance of the panoramic image associated with the shoe sole that is applied with the glue, and
      generate a result of estimation regarding an amount of the glue applied to the shoe sole based on the chromaticity values $M_1$ to $M_m$, where m is an integer not less than one.

2. The system as claimed in claim 1, wherein said panoramic image capturing device has an angle of view that is greater than one hundred and eighty degrees.

3. The system as claimed in claim 2, wherein said panoramic image capturing device includes a fisheye lens having an angle of view that is greater than two hundred and twenty degrees.

4. The system as claimed in claim 1, the sidewall further has an outer surface opposite to the inner surface, said system further comprising:
   a lateral image capturing device set including a plurality of lateral image capturing devices which are disposed around the shoe sole, and each of which is configured to generate a partial lateral image of the outer surface of the sidewall and to output the partial lateral image;
   wherein said processor is further configured to obtain the partial lateral images associated with the shoe sole, and to generate a combinational image by splicing the panoramic image and the partial lateral images.

5. The system as claimed in claim 4, wherein said processor is further configured to perform edge detection process on the panoramic image and the partial lateral images so as to extract an image portion of the panoramic image that is associated with the attachment surface and the inner surface, and image portions of the partial lateral images that are associated with the outer surface from different viewpoints.

6. The system as claimed in claim 5, wherein said processor is further configured to splice the image portion of the panoramic image and the image portions of the partial lateral images so as to result in the combinational image.

7. The system as claimed in claim 4, further comprising a display that is configured to display the combinational image.

8. The system as claimed in claim 4, wherein:
   the chromaticity values $M_1$ to $M_m$ of m number of pixels are selected from an instance of the combinational image associated with the shoe sole that is applied with the glue.

9. The system as claimed in claim 8, wherein:
   said processor is further configured to
      obtain chromaticity values $N_1$ to $N_m$ of m number of pixels selected from a reference image which is another instance of the combinational image associated with the shoe sole that is not applied with the glue, the m number of pixels which are selected from the reference image respectively corresponding to the pixels which are selected from the instance of the combinational image associated with the shoe sole that is applied with the glue,
      calculate m number of deviation values $R_i = M_i - N_i$ where i is an integer ranging from 1 to m, and
      for one of the m number of deviation values $R_i$, generate the result of estimation which indicates that the amount of the glue is normal when it is determined by said processor that a condition that the deviation value falls in a range from $V_0 - A$ to $V_0 + A$ is satisfied, and generate the result of estimation which indicates that the amount of the glue is abnormal when it is determined by said processor that the condition is not satisfied, where $V_0$ represents a predetermined base value, and A represents a predetermined tolerance value.

10. The system as claimed in claim 9, wherein the predetermined base value is $$V_0 = \sum_{i=1}^{m} \frac{V_i - N_i}{m},$$

where $V_1$ to $V_m$ each represent a respective one of m number of predetermined standard values which are chromaticity values of m number of pixels selected from a standard image which is further another instance of the combinational image associated with the shoe sole that is applied with a standard amount of the glue.

11. The system as claimed in claim 9, wherein said processor is configured to
   calculate m number of difference values $J_i = R_i - V_0$ where i is an integer ranging from 1 to m; and
   for one of the m number of difference values $J_i$, generate the result of estimation which indicates that the amount of the glue is normal when it is determined by said processor that the difference value falls in another range from $-A$ to $+A$, generate the result of estimation which indicates that the amount of the glue is deficient when it is determined by said processor that the difference value is smaller than $-A$, and generate the result of estimation which indicates that the amount of the glue is excessive when it is determined by said processor that the difference value is greater than A.

* * * * *